(12) United States Patent
Zenisek

(10) Patent No.: US 6,513,855 B2
(45) Date of Patent: Feb. 4, 2003

(54) AUTOMOBILE REARVIEW MIRROR MOUNTED GLARE SHIELD

(76) Inventor: Robert F. Zenisek, 41 E. Campus Ct., Racine, WI (US) 53402

( * ) Notice: Subject to any disclaimer, the term of this patent is extended or adjusted under 35 U.S.C. 154(b) by 0 days.

(21) Appl. No.: 10/044,236

(22) Filed: Jan. 10, 2002

(65) Prior Publication Data

US 2002/0130530 A1 Sep. 19, 2002

Related U.S. Application Data

(60) Provisional application No. 60/261,383, filed on Jan. 16, 2001.

(51) Int. Cl.[7] ............................................... B60J 3/00
(52) U.S. Cl. ..................... 296/97.9; 296/97.8; 296/97.1
(58) Field of Search ........................ 296/97.1, 97.5, 296/97.7, 97.8, 97.9, 97.11; 160/DIG. 3

(56) References Cited

U.S. PATENT DOCUMENTS

| | | | |
|---|---|---|---|
| 2,033,391 A | 3/1936 | Muench | 88/77 |
| 2,163,495 A | 6/1939 | Levy | 296/97 |
| 2,549,395 A | 4/1951 | Short | 296/97 |
| 2,620,222 A | 12/1952 | Beauchamp | 296/97 |
| 4,172,613 A | 10/1979 | Furando | 296/97 G |
| 4,275,917 A | 6/1981 | Marcus | 296/97 R |
| 4,958,879 A | 9/1990 | Gillum | 296/97.6 |
| 5,333,927 A | 8/1994 | PreJean | 296/97.7 |
| 5,494,328 A | 2/1996 | Lehr | 296/97.6 |
| 5,575,523 A | 11/1996 | Keller | 296/97.7 |
| 5,810,419 A | 9/1998 | Lam | 296/97.1 |
| 5,865,469 A | 2/1999 | Chin | 281/45 |
| 5,979,967 A | 11/1999 | Poulson | 296/97.9 |
| 6,296,294 B1 | 10/2001 | Kohnle et al. | 296/97.9 |

OTHER PUBLICATIONS

Sun Out™ 2000 Walter Drake Catalog.

*Primary Examiner*—D. Glenn Dayoan
*Assistant Examiner*—Scott Carpenter

(57) ABSTRACT

A universal sun glare shield which attaches to the rearview mirror mounting post of most automobiles to block the unwanted sun light above and around the rearview mirror when driving into low sun. The glare shield consists of two planer panels with bosses on their bottom edge held in place by a key-hole shaped keeper to provide a friction-fit to the mirror mounting post. To configure the shield to a specific vehicle, each panel has a plurality of alignment holes which lead to punch-out sections which when removed create a channel in the panels which allow the panels to be securely fastened to the mirror mounting post in a friction fit. The panels also have plurality of break-out sections on their left and right edges and their tops which allows a custom fit to the spacing between the vehicle's sun visors and its headliner.

9 Claims, 4 Drawing Sheets

AUTOMOBILE REARVIEW MIRROR MOUNTED GLARE SHIELD

This application claims the benefit of Provisional Application No. 60/261,383, filed Jan. 16, 2001.

BACKGROUND—FIELD OF INVENTION

The present invention relates to automobile sun visors and sun glare shields and specifically to those attached to the rearview mirror. It is directed to solve the problem of unwanted glare that occurs when driving into a low sun, most particularly in the unshielded area around the rearview mirror.

BACKGROUND—DESCRIPTION OF PRIOR ART

Most automobiles are equipped with two sun visors that are folded up against the head liner of the vehicle when not in use. Also, for the last decade, almost all automobiles have sloping windshields to decrease wind resistance for fuel economy which most often causes the rearview mirror to be affixed to the windshield instead of the upper windshield frame. When used, the sun visors are pulled down to shield the incoming sun glare; but they are configured in such a manner not to interfere with or block the rearview mirror. When the visors are in use, the portion of the windshield surrounding the rearview mirror is not shielded and left unprotected from the glare of the sun. As a result, it is very difficult to use the rearview mirror without being blinded by the sun's glare. This is not a new problem; in fact, U.S. Pat. No. 2,033,391 to H. E. Muench on Mar. 10, 1936 was an early attempt to reduce or eliminate the glare around the rearview mirror. Many solutions to the glare problem have been suggested that require mounting a glare shield to the existing sun visors; unfortunately they can not fully shield the space above and around the rearview mirror without interfering with it.

In the ensuing years many attempts have been made to improve upon Muench's first solution for example: U.S. Pat. No. 2,163,495 to S. M. Levy (Jun. 20, 1939) shows two shields attached to pivot points on the rearview mirror mounting that swing down. U.S. Pat. No. 2,620,222 to M. E. Beauchamp (Dec. 2, 1952) shows a shield that clips to a bracket mounted to the upper windshield frame. U.S. Pat. No. 4,172,613 to J. V. Furando (Oct. 30, 1979) shows a glare shield that mounts to the windshield with suction cups. This shield has several marketing deficiencies: One, it is made of molded plastic of a single size which means customers would be required to possibly pay for plastic they would discard if the shield was too large. Two, its design would allow light to pass through the breakaway sections needed to fit it to the mirror. U.S. Pat. No. 4,275,917 to K. H. Marcus (Jun. 30, 1981) shows a glare shield that attaches to the head liner. U.S. Pat. No. 5,494,328 to J. J. Lehr (Feb. 27, 1996) shows a glare shield mounted by a clip attached to the windshield frame and a suction cup. All of the above solutions require some type of permanent mounting to the windshield metalwork or suction cups.

Another approach taken by others is to use the rearview mirror mounting post as the support for the glare shield. For example: U.S. Pat. No. 2,549,395 to C. A. Short Sr. (Apr. 17, 1951) shows a shield that has a slot with several mounting holes that allows it to hang on the rearview mirror mounting post. U.S. Pat. No. 4,958,879 to J. H. Gillum (Sep. 25, 1990) shows a folding shield with a mounting slot that slips over the rearview mounting post. Both of these solutions have several faults: One, they have slots in their design through which the sun can pass. Two, they are of a fixed size which precludes universality. Three, both are not firmly fixed to the mirror mounting post which would cause them to move or vibrate when the vehicle is moving. U.S. Pat. No. 5,333,927 to R. M. PreJean (Aug. 2, 1994) shows a multi-functional sun shielding and storage device that mounts by wedging the device behind the mirror or by a separate suction device. While this device would shield the space above the mirror, the varying spacing between the standard visors between different vehicles would require it either to be large enough to fit the largest possible visor spacing and be cut to fit smaller ones or not fully shield the glare. U.S. Pat. No. 5,575,523 to T. F. Keller (Nov. 19, 1996) shows a swinging shield mounted to the rearview mirror post. This device would require the driver to constantly reposition the device as the road curved or sun changes position. U.S. Pat. No. 5,810,419 to K. Lam (Sep. 22, 1998) shows a shield that is directly attached to the rearview mirror by two brackets. U.S. Pat. No. 5,979,967 to T. C. Poulson (Nov. 9, 1999) also shows a shield that is directly attached to the rearview mirror with hook and loop fasteners. This method of mounting could cause a possible conflict with the use of the sun visors. In both of these solutions we have the problem of universality in trying to fit the device to the wide variety of mirror sizes and visor spacings as well as an expensive solution.

The latest solution to the problem of unwanted glare above and around the rearview mirror is U.S. Pat. No. 6,296,294B1 issued to K. F. Kohnle and M. E. Bouches (Oct. 2, 2001). This shows a shield attached to the rearview mirror mounting post using a hook and loop fastener to secure it to the mounting post. This solution has several disadvantages: One, as most of the other solutions, it is of a fixed size; but, because the mirror and sun visor spacing varies considerably in vehicles so it may not fit well. Two, it is not securely fastened to the mounting post and would vibrate and/or rotate when the vehicle is moving. Three, its design requires more manufacturing steps and a higher material cost than the present invention. This would result in a higher selling price than the proposed solution.

A detailed examination of the patents listed above and many others reveals that although there are many solutions to shielding the glare around the rearview mirror from low sun in an automobile; a search of automobile parts dealers revealed that none of the above solutions is currently being marketed. The only glare shield found that specifically addressed the glare around the rearview mirror was a suction cup mounted plastic device of a fixed size is being sold as SUNOUT.RTM and marketed through the Walter Drake catalog. A local auto parts dealer was selling a device called a BLUE STOPPER.RTM manufactured by Cobbs Mfg. in Iowa which is a also a sheet of plastic with a suction cup mounting that could be positioned anywhere on the windshield.

All past solutions appear to have some significant problems in marketing them to the public: One, is that the design of many would make the final product too costly. Two, many require special mounting to make them effective which would discourage the average customer. Three, most appear to be of a fixed size which would preclude maximum shielding given the wide variety sun visor spacings and rearview mirror mounting positions. And lastly, many are not securely mounted enabling them to move or vibrate when the vehicle is moving.

OBJECTIVES AND ADVANTAGES

Unwanted sun glare is quite often a driving annoyance which is easily forgotten so the average driver is probably not going to invest a large amount of effort and expense on solving the problem. Thus, the objectives of the present invention are to overcome the deficiencies of the previous solutions and provide a glare shield that is flexible in terms of mounting, adjustable in size to fit various vehicles, easy to manufacture, simple to install, securely mounted, and can be sold at a very competitive price.

Therefore, the first objective of this invention is to provide a shield that will work with the existing sun visors with no modifications to the visors, the rearview mirrors or the inside of the vehicle. Many of the prior art solutions require the installation of brackets to the windshield frame or to the mirror to make the shielding device work. This alone would frighten off most customers Another, objective is to provide a method of mounting that is quick and reliable to prevent slippage of the shield while the vehicle is moving. Some prior art solutions use suction cups or adhesive to fix the shield in place. Low sun is most prevalent in the winter months and ensuring that a suction cup or removable adhesive will stay in place on a cold windshield is always a problem. Quick and easy dismounting of the shield when it is not required is another requirement as is easy stowage in the vehicle.

Because many of the prior art solutions would require the use of expensive materials which would raise the cost of the device; it is also the object of this invention to provide a glare shield that is made of a low cost material. The preferred embodiment would use a material, such as chipboard or some other fiber board, that may be easily cut along weakened areas and allow punch-out sections to be easily removed for mounting. This allows the glare shield to be conveniently tailored to specific vehicle visor and mirror spacing to maximize the shielding. This overcomes another of the prior art disadvantages, the ability to configure a glare shield to any vehicle as most of the prior art solutions indicate a shield of a fixed size.

While the preferred embodiment would use a fiberboard material for the shielding panels because of lower cost and ease of cutting to specifically configure the shield to a vehicle, other materials such opaque plastic sheet, thin metal or even translucent plastic could be used. Use of these materials would require creating expensive manufacturing tooling designed to fit a specific vehicle as they could not be easily cut by the customer and therefore would increase the cost of the shield. This also means that a "one size fits all" approach could not be used with these material.

The preferred embodiment of the glare shield consists of two specially shaped planar panels having curved registration sections and bosses on the bottom edge held together with a keyhole shaped plastic or metal keeper mounted on the bottom edge which engages the bosses on the bottom of each panel. The keeper allows the two panels to slide together in a tight friction fit to grip the rearview mirror mounting post to hold the shield in place. The curved registration sections allow the two panels of the shield to be opened for ease of fitting and mounting. The panels have a series of preformed alignment holes with connecting punch-out sections to fit the shield to the rearview mounting post of the vast majority of vehicles. The holes are sized to fit the narrow section of a typical rearview mirror mounting post where it engages the windshield mount. The punch-out sections, when removed, create a channel which allows the two panels to slide together and grip the rearview mirror mounting post. Panels have additional weakened breakaway portions in the horizonal and vertical planes to allow for correct horizonal and vertical shield spacing for maximum shielding between the vehicle's existing sun visors. The horizonal weakened sections could be specifically fit so the upper edge of the glare shield would fit into the normal space or gap between the head liner and the windshield frame for a even more secure mounting.

REFERENCE NUMBERS IN THE DRAWINGS

10 Glare shield assembly.
11 Glare shield left hand member.
12 Glare shield right hand member.
13 Glare shield left hand member boss.
14 Glare shield right hand member boss.
15 Glare shield left hand member mounting alignment holes.
16 Glare shield right hand member mounting alignment holes.
17 Glare shield left hand member mounting punch-out sections
18 Glare shield right hand member mounting punch-out sections.
19 Glare shield left hand member horizonal weakened sections.
20 Glare shield right hand member horizonal weakened sections.
21 Glare shield left hand member vertical weakened sections.

22 Glare shield right hand member vertical weakened sections.
23 Glare shield left hand member curved registration section.
24 Glare shield right hand member curved registration section.
25 Glare shield key-hole shaped keeper.
26 Automobile rear view mirror.
27 Typical automobile left sun visor.
28 Typical automobile right sun visor.
29 Typical automobile windshield.
30 Typical automobile rear view mirror mounting post.
31 Typical automobile windshield mount for the rear view mirror mounting post.
32 Typical sun visor mounting bracket.
33 Automobile head liner.
34 Automobile roof
35 Automobile windshield mounting frame.
36 Narrow area on a typical windshield mirror mounting post,
37 Another embodiment of the keeper.

DESCRIPTION OF THE PREFERRED EMBODIMENT

Figure 1:
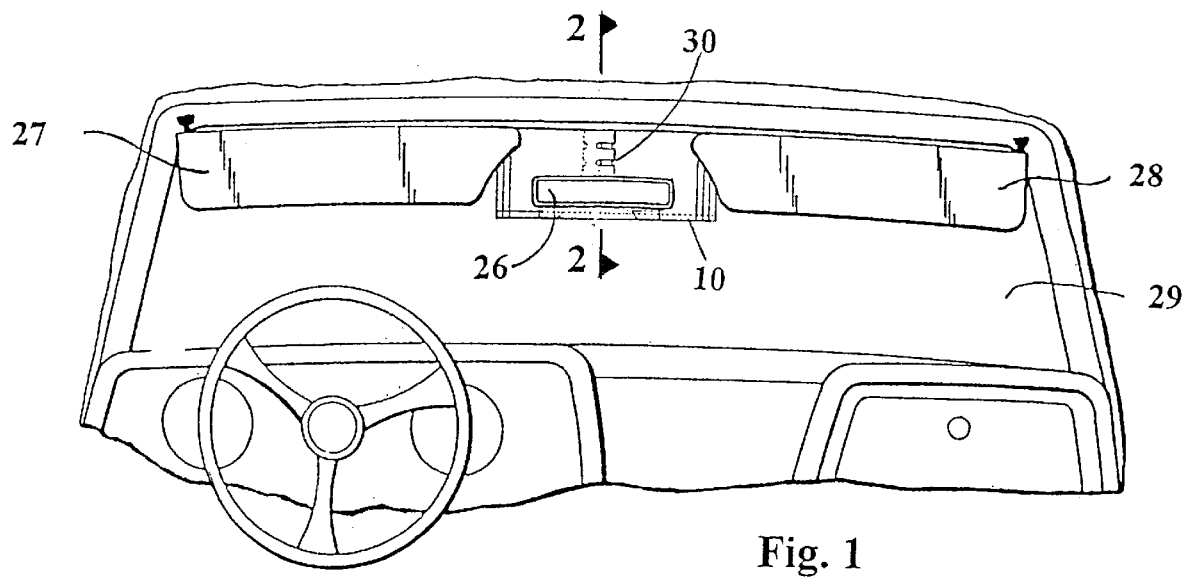
FIG. 1 is a fragmentary elevation view of the windshield area of a automobile as viewed from the interior with the standard sun visors in the down or in use position and a specifically configured version of the preferred embodiment of the glare shield attached to the mirror mounting post.

Referring to the drawings starting with FIG. 1 where the present invention, a glare shield, generally designated as 10 is shown mounted in a automobile on the rearview mirror mounting post 30 behind the windshield mounted rearview mirror 26. The vehicle having a left sun visor 27 and a right sun visor 28 shown in the down or in use position. It can be seen that the glare shield is mounted behind the sun visors 27 and 28.

Figure 2:
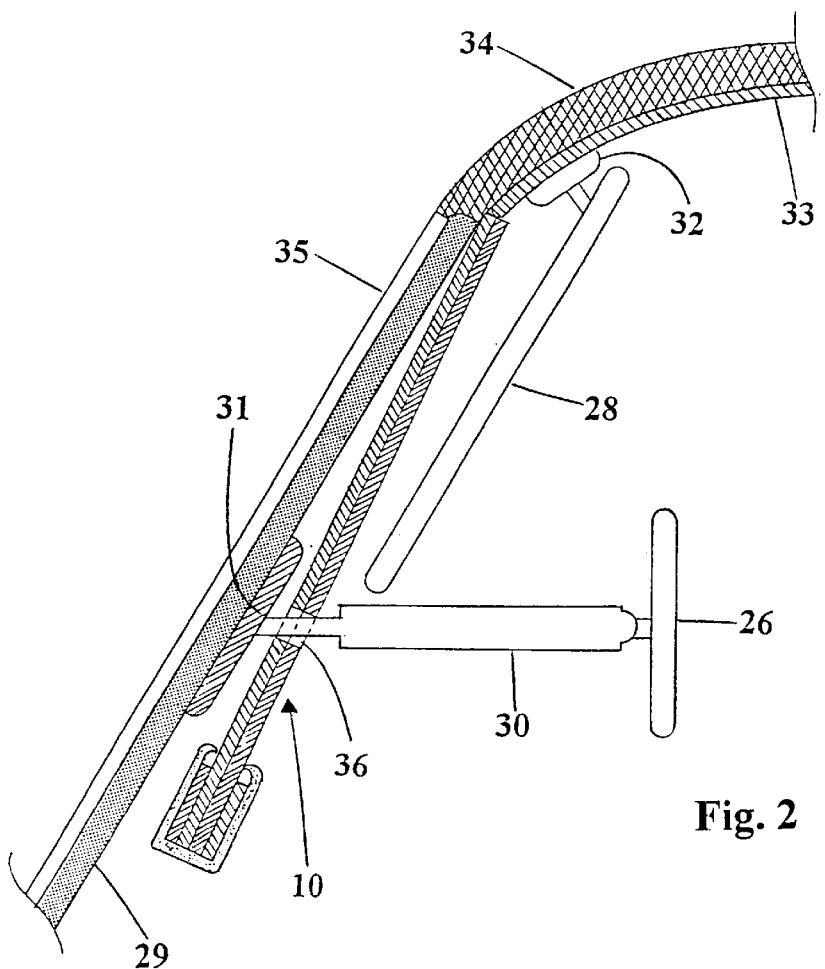
FIG. 2 is a cross-sectional view of a specifically configured version of the preferred embodiment of the glare shield through a typical windshield and the rearview mirror mounting post taken along line 2—2 of FIG. 1.

FIG. 2 is a cross sectional view of the present invention taken along line 2—2 of FIG. 1. In FIG. 2 is shown a cross-section through a typical automobile windshield with a roof 34, windshield mounting frame 35, windshield 29, windshield mount for rearview mirror mounting post 31, rearview mirror mounting post 30, rearview mirror 26, head liner 33, sun visor mounting bracket 32, and right sun visor 28. In FIG. 2, the glare shield 10 can be seen mounted on the rearview mirror mounting post 30 fitting tightly into the narrow area 36 of a typical windshield mounted mirror mounting post 30. The narrow area 36 has been exaggerated for clarity. The shield 10 has been configured along its top to fit tightly against the head liner 33 to provide a more secure mounting. It also can be seen that the glare shield 10 is in front the rearview mirror 26 and the right sun visor 28 and in no way interferes with the movement or positioning of the rearview mirror 26 or the sun visors 27 and 28.

Figure 3:
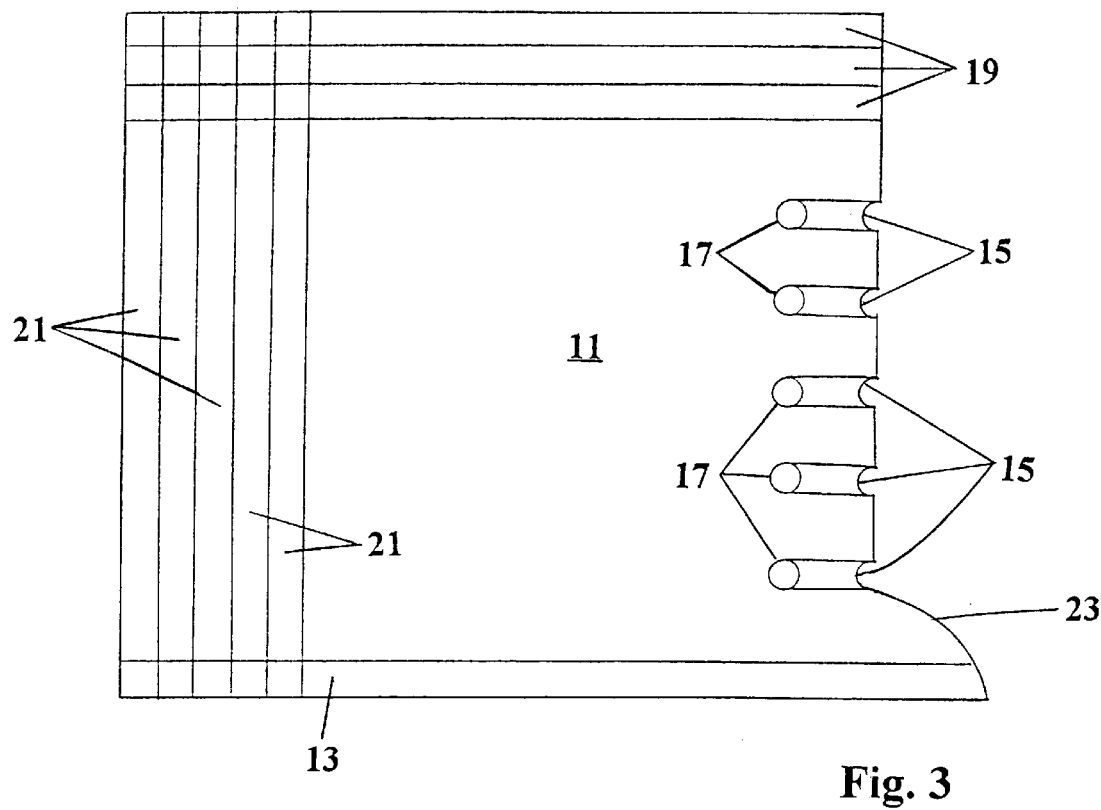
FIG. 3 is a plan view of the left hand member of the glare shield.
Figure 4:
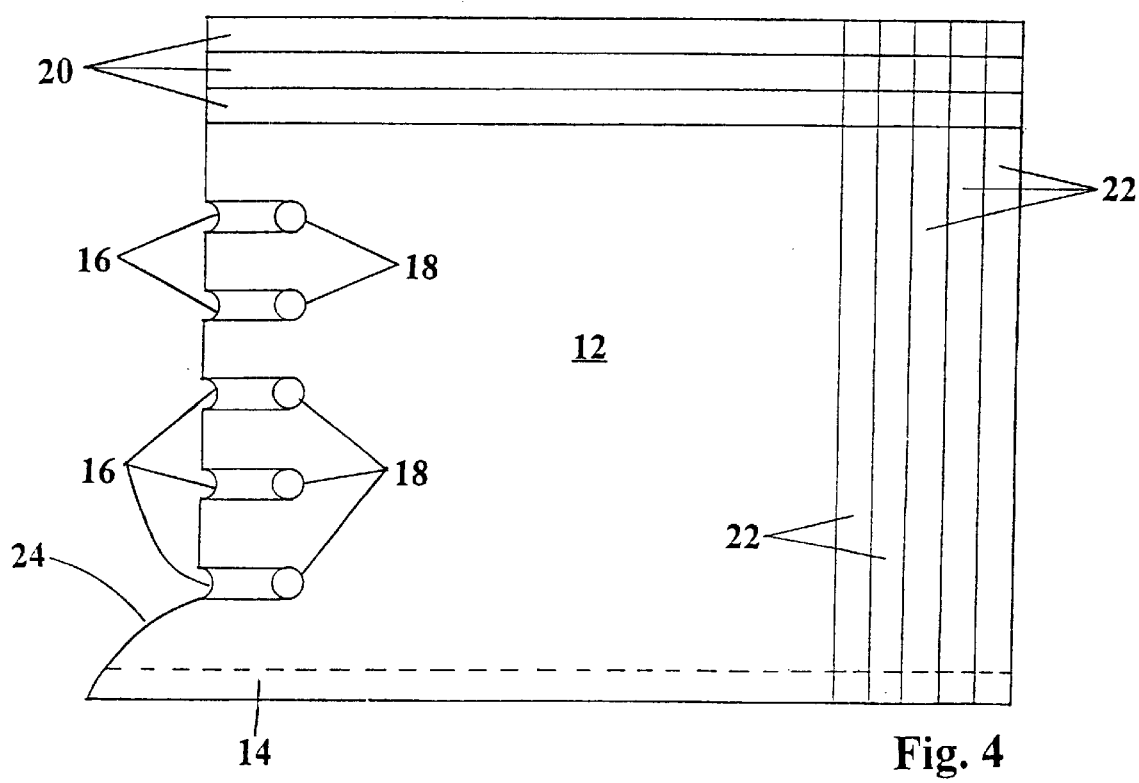
FIG. 4 is a plan view of the right hand member of the glare shield.
Figure 8:
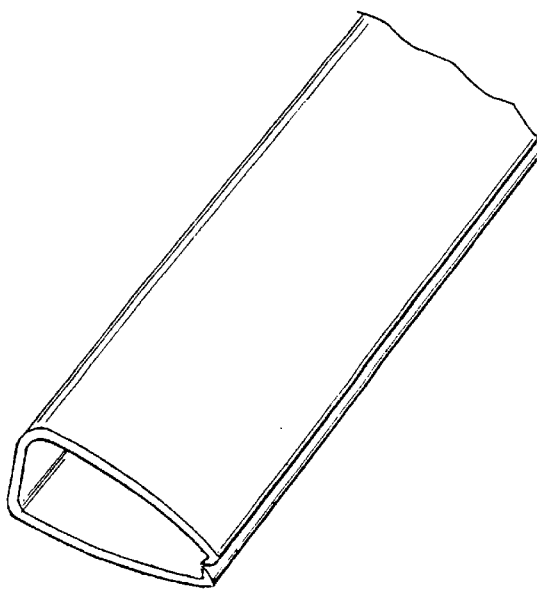
FIG. 8 is a perspective view of the preferred embodiment the keeper which is the binding bar from U.S. Pat. No. 5,865,469 issued to M. Chin (Feb. 2, 1999) and assigned to Avery Dennison Corporation.

In FIG. 3 is shown the left panel 11 of the glare shield and in FIG. 4 is shown the right panel 12 of the glare shield. The preferred material for the panels would be chipboard or some other form of fiberboard that is calendered on both sides. The panels have a plurality of semi-circular mounting alignment holes, 15 and 16, along their leading edge. Curved registration sections, 23 and 24, also along the leading edge are provided to enable the two panels, 11 and 12, to align and mate with each other during configuration and assembly. A plurality of weakened punch-out mounting sections consisting of a hole and connecting channel, 17 and 18, connect to the mounting alignment holes, 15 and 16, to provide a channel for mounting the panels, 11 and 12, to the mirror mounting post 30. The panels also have a plurality of horizonal weakened breakaway sections, 19 and 20; and vertical weakened breakaway sections, 21 and 22, that can be easily removed to configure the glare shield assembly 10 to a specific vehicle. Both panels, 11 and 12, have bosses, 13 and 14 respectively, on their bottom edge which are used to engage a keeper 25 to hold the panels, 11 and 12, together. FIG. 8 is a perspective view of a keeper, 25.

Figure 5:
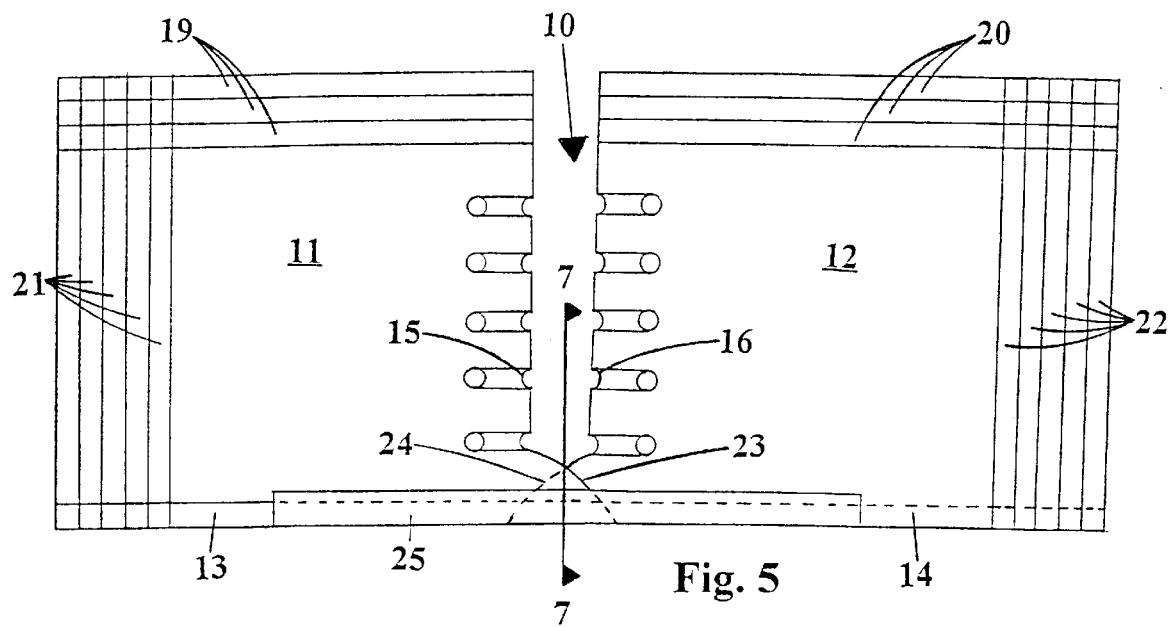
FIG. 5 is a front view in elevation of this invention as it would appear prior to configuration, with all the punch-out and breakaway sections in place.

In FIG. 5 is shown the glare shield assembly 10 having a left panel 11 and a right panel 12 and a keeper 25 engaged to capture the bosses 13 and 14 on the bottom of the panels as the glare shield would appear prior to configuration. All the weakened punch-out sections, 17 and 18, and weakened breakaway horizonal sections, 19 and 20 and the weakened breakaway vertical sections, 21 and 22, are still in place. The two curved registration and alignment sections, 23 and 24 are being used to lock the two panel 11 and 12 within the keeper 25 and still provide an opening to allow the selection of the proper pair of alignment holes. Also indicated is the identification of an alignment hole pair, 15 and 16, selected as the candidates for mounting.

Figure 6:
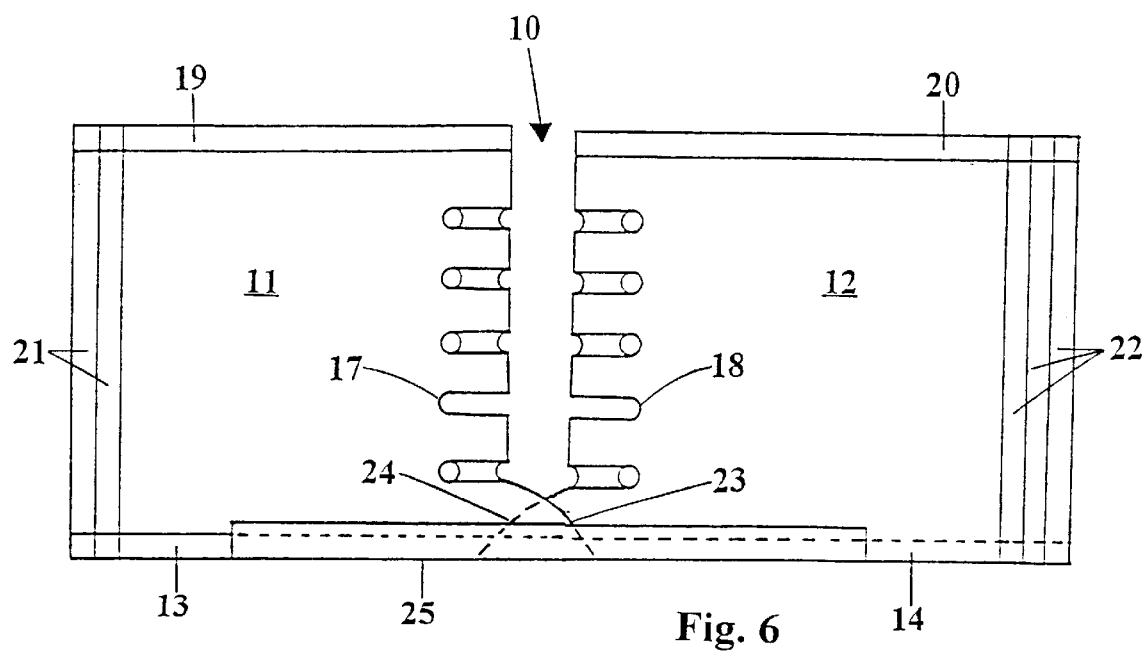
FIG. 6 is a front view in elevation of this invention as it would appear configured to a specific vehicle with selected horizonal and vertical breakaway portions removed and the proper mounting holes and their punch-out sections removed prior to mounting on the rearview mirror supporting post.

FIG. 6 is a view of the glare shield 10 after configuration to a specific vehicle and just prior to mounting on the vehicle's rearview mirror mounting post. The selected alignment hole pair, 15 and 16, identified in FIG. 5 has had their corresponding weakened punch-out sections, 17 and 18, removed creating a mounting channel in each of the panels 11 and 12. Several weakened horizonal breakaway sections, 19 and 20, have been removed to make the glare shield assembly 10 shorter to fit tighter to the vehicle's head liner. Also, several weakened vertical breakaway sections, 21 and 22, have been removed for a better fit between the vehicles normal sun visors.

The glare shield 10 in FIG. 1, is an example of the configured glare shield described in FIG. 6 mounted to the rearview mirror mounting post in a vehicle.

Figure 7:
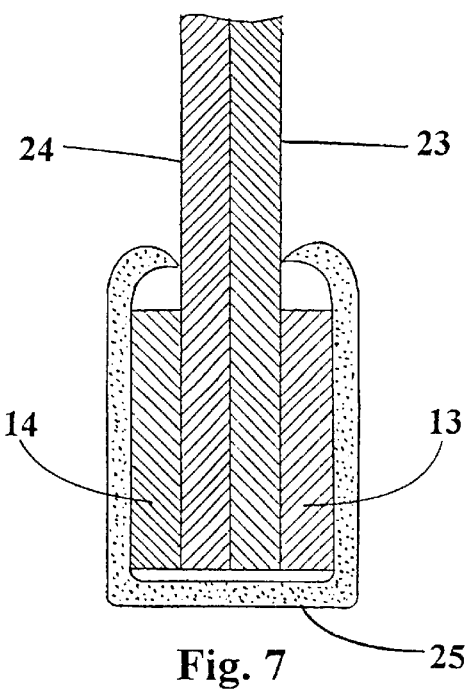
FIG. 7 is a cross-sectional view taken along line 7—7 of FIG. 5.

FIG. 7 is a cross-sectional view taken along line 7—7 of FIG. 5. It shows how the curved registration sections, 23 and 24, on the panels 11 and 12 along with the panel bosses, 13 and 14 align the two panels 11 and 12 within the keeper 25 and allow the glare shield assembly 10 to be held in an open position for ease of initial alignment for configuration and all subsequent mountings.

Figure 9:
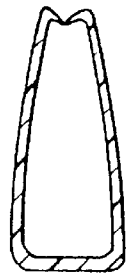
FIG. 9 is a cross-sectional view of the preferred embodiment of the keeper in its unassembled form.

FIG. 9 is the cross-sectional view of the preferred embodiment of the keeper in its unassembled form.

Figure 10:
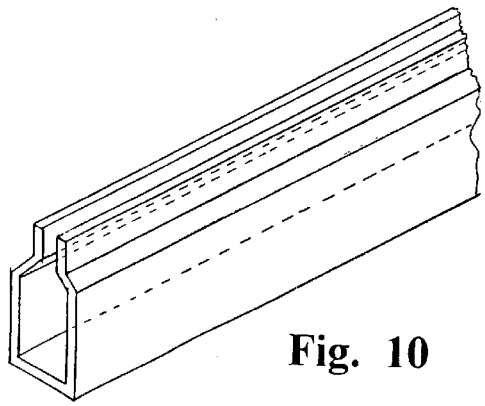
FIG. 10 is a perspective view of another embodiment of the keeper.
Figure 11:
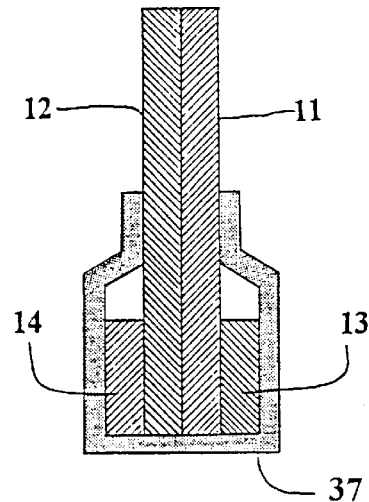
FIG. 11 is a cross-sectional view taken along line 7—7 of FIG. 5 using the embodiment of the keeper shown in FIG. 10.

FIG. 11 is a cross-sectional view taken along line 7—7 of FIG. 7 of another embodiment of the keeper shown in FIG. 10 as it would be used to assemble the two panels, 11 and 12, together.

I claim:

1. A glare shield for attachment to a vehicle's rearview mirror mounting post, said glare shield consisting of a pair of overlapping rectangular panels with slidable means to provide a friction fit to said rearview mirror's mounting post and allow positioning said glare shield behind the rearview mirror and said vehicle's sun visors and in front of said vehicle's windshield.

2. The glare shield as set forth in claim 1 wherein said panels each having a boss on their bottom edge are captured by a keyhole shaped keeper which provides means to allow said panels to slide together in a friction fit against said rearview mirror's mounting post.

3. The keeper as set forth in claim 2 may be constructed of chipboard, fiberboard, plastic, metal or any other substance which can provide the required shape and rigidity as well as providing means to capture said panels while allowing said panels to slide together in a friction fit.

4. The glare shield as set forth in claim 1 wherein said panels are of sufficient width such that the space between said vehicle's rearview mirror and said vehicle's head liner is completely filled and said panels are of sufficient length to substantially cover the space between said vehicle's right and left sun visors.

5. The glare shield as set forth in claim 1 wherein said panels have a curved registration section providing means of keeping said panels aligned and the shield assembly opened during configuration and subsequent mounting to said vehicle's rearview mirror mounting post.

6. The glare shield as set forth in claim 1 wherein said panels have a plurality of semicircular alignment holes along their front edge with connecting punch-out sections which provide means for creating longitudinal channels or slots for mounting said shield assembly to said rearview mirror mounting post in a friction fit.

7. The glare shield as set forth in claim 1 wherein said panels have a plurality of vertical and horizonal break-out sections providing means to configure said shield assembly to a vehicle's sun visor and head liner spacing.

8. The glare shield as set forth in claim 1 wherein the material used to construct said panels is such that it will provide means to completely block or substantially reduce the passage of sun light through said panels.

9. A glare shield assembly system for attachment to a vehicle's rearview mirror's mounting post consisting of two planar panels with bosses on the bottom edge of said panels and where said panels are held together by a keyhole shaped keeper which provides means allowing said panels to side together in a friction fit to said mirror mounting post, said panels incorporating curved registration sections, alignment holes, punch-out channel sections, horizonal and vertical break-out sections all of which provide means to specifically configure said glare shield assembly to a specific vehicle.

* * * * *